United States Patent [19]
Huang

[11] Patent Number: 5,618,041
[45] Date of Patent: Apr. 8, 1997

[54] SLIP RESISTANT SPORT GRIP

[76] Inventor: Ben Huang, 19472 Woodlands La., Huntington Beach, Calif. 92648

[21] Appl. No.: 400,050

[22] Filed: Mar. 7, 1996

Related U.S. Application Data

[63] Continuation-in-part of Ser. No. 196,010, Feb. 10, 1994, Pat. No. 5,374,059, and Ser. No. 278,186, Jul. 21, 1994, Pat. No. 5,397,123.

[51] Int. Cl.$^6$ ................................................ A63B 49/08
[52] U.S. Cl. ........................................ 473/549; 473/302
[58] Field of Search .................. 273/70 J, 75; 473/300, 473/301, 302, 303

[56] References Cited

U.S. PATENT DOCUMENTS

| | | |
|---|---|---|
| 1,139,843 | 5/1915 | Brown . |
| 1,435,088 | 11/1922 | Smith ........................................ 473/302 |
| 1,556,781 | 10/1925 | Gjorup . |
| 1,587,082 | 6/1926 | Mattern ........................................ 473/302 |
| 1,701,856 | 2/1929 | Kraeuteru et al. . |
| 1,940,104 | 12/1933 | Russell et al. . |
| 1,943,399 | 1/1934 | Smith . |
| 2,003,917 | 6/1935 | Bowden . |
| 2,046,164 | 6/1936 | Herkner . |
| 2,086,062 | 7/1937 | Bray ........................................ 473/302 |
| 2,166,044 | 7/1939 | Fletcher . |
| 2,166,045 | 7/1939 | Fletcher . |
| 2,513,655 | 7/1950 | Lamkin et al. . |
| 3,582,456 | 6/1971 | Stolki . |
| 3,654,066 | 4/1972 | Fukushima et al. . |
| 3,845,954 | 11/1974 | Case . |
| 3,848,480 | 11/1974 | Oseroff . |
| 3,848,871 | 11/1974 | Sweet . |
| 3,860,469 | 1/1975 | Grergorian et al. . |
| 3,881,521 | 5/1975 | Johansen et al. . |
| 3,899,172 | 8/1975 | Vaugh et al. . |
| 4,015,851 | 4/1977 | Pennell . |
| 4,044,625 | 8/1977 | D'Haem . |
| 4,070,020 | 1/1978 | Dano . |
| 4,100,006 | 7/1978 | Buckley . |
| 4,174,109 | 11/1979 | Gaiser . |
| 4,284,275 | 8/1981 | Fletcher . |
| 4,347,280 | 8/1982 | Lau et al. . |
| 4,454,187 | 6/1984 | Flowers et al. . |
| 4,552,713 | 11/1985 | Cavicchioli ........................ 473/303 X |
| 4,567,091 | 1/1986 | Spector . |
| 4,647,326 | 3/1987 | Pott . |
| 4,660,832 | 4/1987 | Shomo . |
| 4,662,415 | 5/1987 | Prout . |
| 4,736,949 | 4/1988 | Muroi . |
| 4,765,856 | 8/1988 | Doubt . |
| 4,853,054 | 8/1989 | Turner et al. . |
| 4,919,420 | 4/1990 | Sato ........................................ 473/303 X |
| 4,934,024 | 6/1990 | Sexton, I . |
| 5,018,733 | 5/1991 | Buand ........................ 273/73 J X |
| 5,042,804 | 8/1991 | Uke . |
| 5,110,653 | 5/1992 | Landi . |
| 5,275,407 | 1/1994 | Soong . |
| 5,374,059 | 12/1994 | Huang . |

FOREIGN PATENT DOCUMENTS

| | | |
|---|---|---|
| 2398099 | 7/1977 | France . |
| 2805314 | 8/1979 | Germany . |
| 3414978 | 10/1985 | Germany . |
| 3612986 | 10/1987 | Germany ........................ 273/73 J |
| 4339133 | 7/1994 | Germany ........................ 273/73 J |
| 63-19834 | 11/1994 | Japan ........................ 273/73 J |
| 443228 | 2/1936 | United Kingdom . |
| 870021 | 6/1961 | United Kingdom . |
| 979242 | 1/1965 | United Kingdom . |

*Primary Examiner*—William E. Stoll
*Attorney, Agent, or Firm*—Fulwider Patton Lee & Utecht, LLP

[57] ABSTRACT

A tennis racquet and grip for the handle of such tennis racquet. The grip has a polyurethane layer bonded to a felt layer. The polyurethane layer is formed with a plurality of dimples, each of which merge into a perforation that extends through the felt layer. The polyurethane layer is also formed with treads which channel perspiration into the dimples and additionally increase the functional contact between the users fingers and the grip. The racquet handle is formed with air passages in communication with the dimples and perforations to reduce formation of perspiration on the grip and to enhance the cushioning qualities of the grip.

9 Claims, 4 Drawing Sheets

FIG. 5
FIG. 6
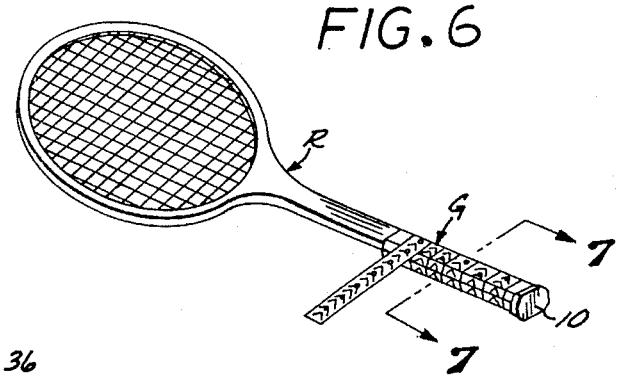
FIG. 7
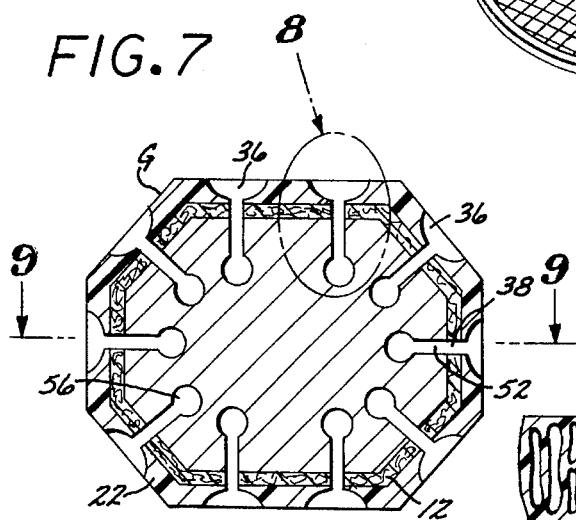
FIG. 8
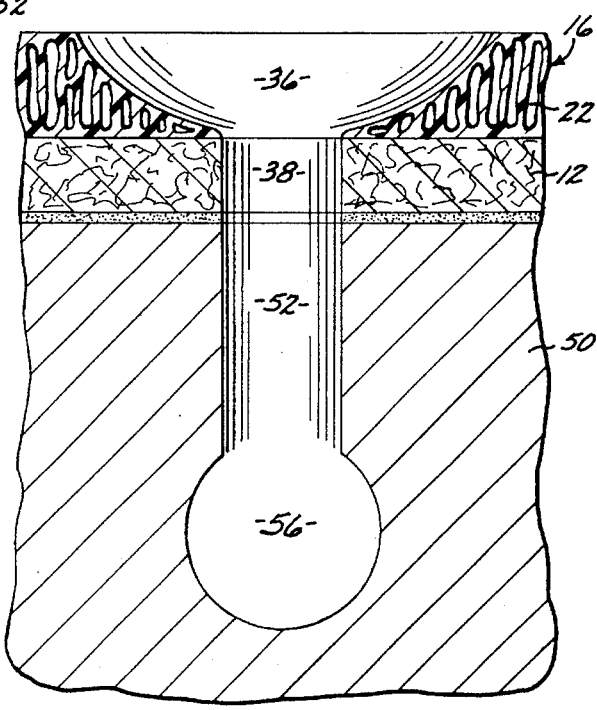
FIG. 13
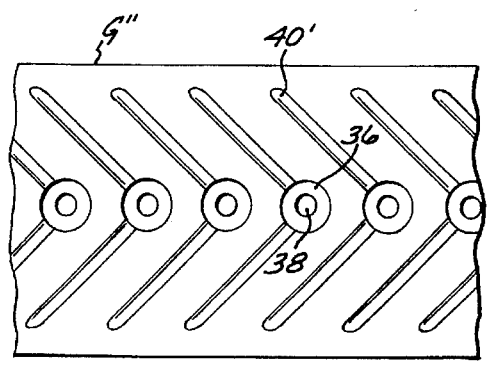

5,618,041

SLIP RESISTANT SPORT GRIP

This application is a continuation-in-part of my patent application Ser. No. 08/196,010 filed Feb. 10, 1994, and issued Dec. 20,1994 as U.S. Pat. No. 5,374,059, and my patent application Ser. No. 08/278,186 filed Jul. 21, 1994 and issued Mar. 14,1995, as U.S. Pat. No. 5,397,123.

BACKGROUND OF THE INVENTION

The present invention relates to a slip resistant sport grip and other devices employing handles that are subject to shock when such devices are impacted, as for example, tennis racquets, racquetball racquets, golf clubs, baseball bats and hammers.

It is well-known that shock generated by impact between a device such as a tennis racquet, and a tennis ball can affect muscle tissue and arm joints such as elbow joints. Such shock often results in "tennis elbow" which is a painful affliction commonly experienced by active tennis players. Medical theories attribute "tennis elbow" to continuous exposure of the playing arm of a tennis player to shock and vibration generated by striking a tennis ball with a tennis racquet. The energy generated is usually of high frequency and short duration with rapid decay, and which is often known as "impact shock." Tight grasping of a grip to keep it from slipping contributes to "tennis elbow." While various types of grips have been proposed for inhibiting "tennis elbow," the grip of the present invention successfully reduces or even eliminates "tennis elbow" type shock to the muscle tissue and arm joints of the users of tennis racquets, racquetball racquets, golf clubs, baseball bats, and other impact imparting devices.

It is also well-known that perspiration tends to be deposited upon a racquet grip by a player's hand thereby inhibiting the player's control of the racquet. In an effort to reduce the perspiration problem, some racquet grips have utilized straight perforations extending through the grip. These grips, however, have not solved the problem. It has also been proposed to provide a grip with inwardly extending dimples, the lower portion of which merges into a perforation which extends through the grip. Such grips provide important advantages over conventional grips.

SUMMARY OF THE INVENTION

The applicant has developed an improved grip, particularly designed to provide excellent shock absorbing qualities when mounted upon the handle of "wide-body" tennis racquets which have achieved wide popularity. Applicant's preferred form of improved grip utilizes a polyurethane outer layer, not only to provide tackiness, but more importantly, to cushion the arm and hand of the racquet user against the shock created when the tennis ball hits the tennis racquet. A layer of felt is bonded to the inner surface of applicant's polyurethane layer in order to provide strength to such polyurethane layer, and also as a means for attaching the bonded-together polyurethane layer and textile layer to the racquet handle. The improved grip of the present invention additionally aligns the pores of the polyurethane layer generally normal to the longitudinal axis of the racquet handle so as to further improve the cushioning characteristics of the polyurethane layer.

It is an important feature of the present invention that the polyurethane layer of the grip is provided with a plurality of inwardly extending dimples, the lower portion of each of which merges into a perforation which extends through the felt layer. Additionally, such improved grip further includes treads formed on the outer surface of the grip, at least some of which intersect the dimples. Such treads serve to channel perspiration from the player's hand into the dimples and then into the perforations to thereby reduce slippage of the player's hand on the surface of the grip. The treads additionally increase the frictional contact of the player's hand relative to the grip.

It is an additional feature of the present invention that the racquet handle may be formed with air passages that connect the treads, dimples, and perforations of the grip with the atmosphere. When the grip is grasped by a player with the palm and fingers of the player's hand covering some of the dimples, air is first pumped inwardly through the dimple and perforations into the racquet air passages and then to the atmosphere. When the player relaxes his grip and uncovers the dimples, air will be sucked back through the perforations, dimples, and racquet air passages. Where the grip utilizes a felt layer, such felt layer assists movement of the air inwardly and outwardly relative to the grip because of its porosity. The interchange of air as it is pumped through the grip and racquet air passages serves to continually evaporate perspiration which would normally accumulate on the exterior surface of the grip. Accordingly, the player maintains a better grasp of the grip than is true with previously known grips. In this manner, the player can more accurately control the flight of the ball. Also, the shock absorbing qualities of the grip are improved to thereby reduce the tendency of the player to acquire "tennis elbow." Moreover, perspiration forced radially inwardly through the dimples and perforations enter the racquet passages to be evaporated in such passages.

BRIEF DESCRIPTION OF THE DRAWINGS

FIG. 5 is a further enlarged view of the encircled area designated 5 in FIG. 4;

FIG. 6 is a perspective view in reduced scale showing the grip of FIGS. 1 through 5 being applied to the handle of a conventional tennis racquet;

FIG. 7 is a vertical sectional view taken in enlarged scale along line 7—7 of FIG. 6;

FIG. 8 is a further enlarged view of the encircled area designated 8 in FIG. 7;

FIG. 13 is a broken top view of a modified grip embodying the present invention.

DETAILED DESCRIPTION OF THE DRAWINGS

Figure 1:
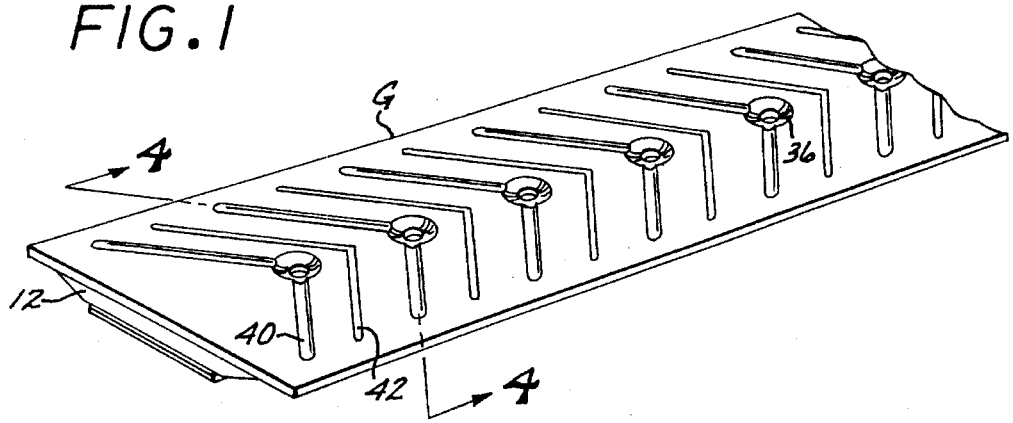
FIG. 1 is a broken perspective view of an improved shock absorbing grip embodying the present invention.

Referring to the drawings, a preferred form of grip G of the present invention is shown in FIG. 6 being attached to the handle 10 of a conventional tennis racquet R. The grip G incudes an open-pored textile layer, generally designated 12, having an inner surface 14 which is adhered to the racquet handle 10. The grip also includes a smooth closed pore polyurethane layer generally designated 16 which is bonded to the textile layer 12. The bonded-together polyurethane and textile layers are seen to be configured as a unitary strip which is wrapped about the racquet handle 10 in the manner depicted in FIG. 6.

More particularly, the textile layer 12 is formed of a suitable open-pored material, such as felt, and has its upper surface 18 bonded to the lower surface 20 of the polyurethane layer 16. As indicated in FIGS. 5, 8, 11, and 12, the polyurethane layer 16 is formed with pores 22 which extend vertically, i.e., generally normal to the longitudinal axis of racquet handle 10 when the grip is affixed to such handle. The polyurethane layer 16 may be formed in a conventional manner by coating one side of a felt strip with a solution of polyurethane (e.g., polyester or polyether) dissolved in dimethyl formamide (DMF), immersing the coated strip in water baths to displace the DMF and to cause the urethanes to coagulate, and finally driving off the water by the application of pressure and heat. In this manner, pores 22 extending perpendicularly relative to the strip's longitudinal axis are formed while the underside of the polyurethane strip is bonded to the outer surface 18 of the felt strip.

Figure 3:
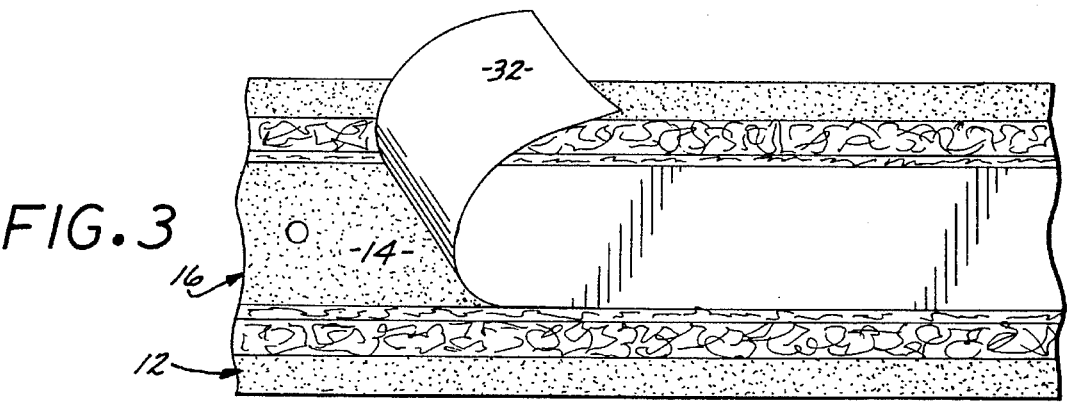
FIG. 3 is a broken view of the underside of said grip.
Figure 4:
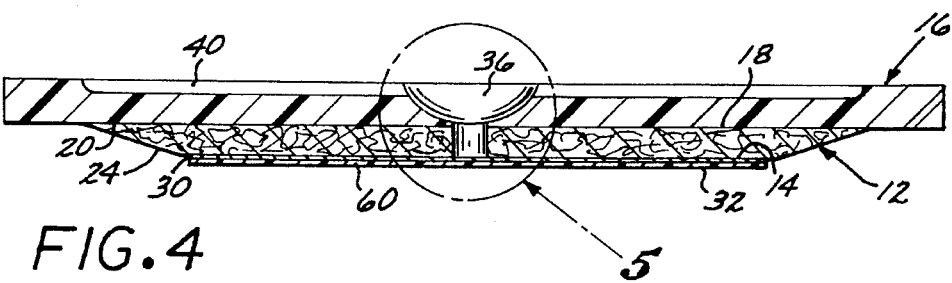
FIG. 4 is a vertical sectional view taken in enlarged scale along line 4—4 of FIG. 1.
Figure 9:
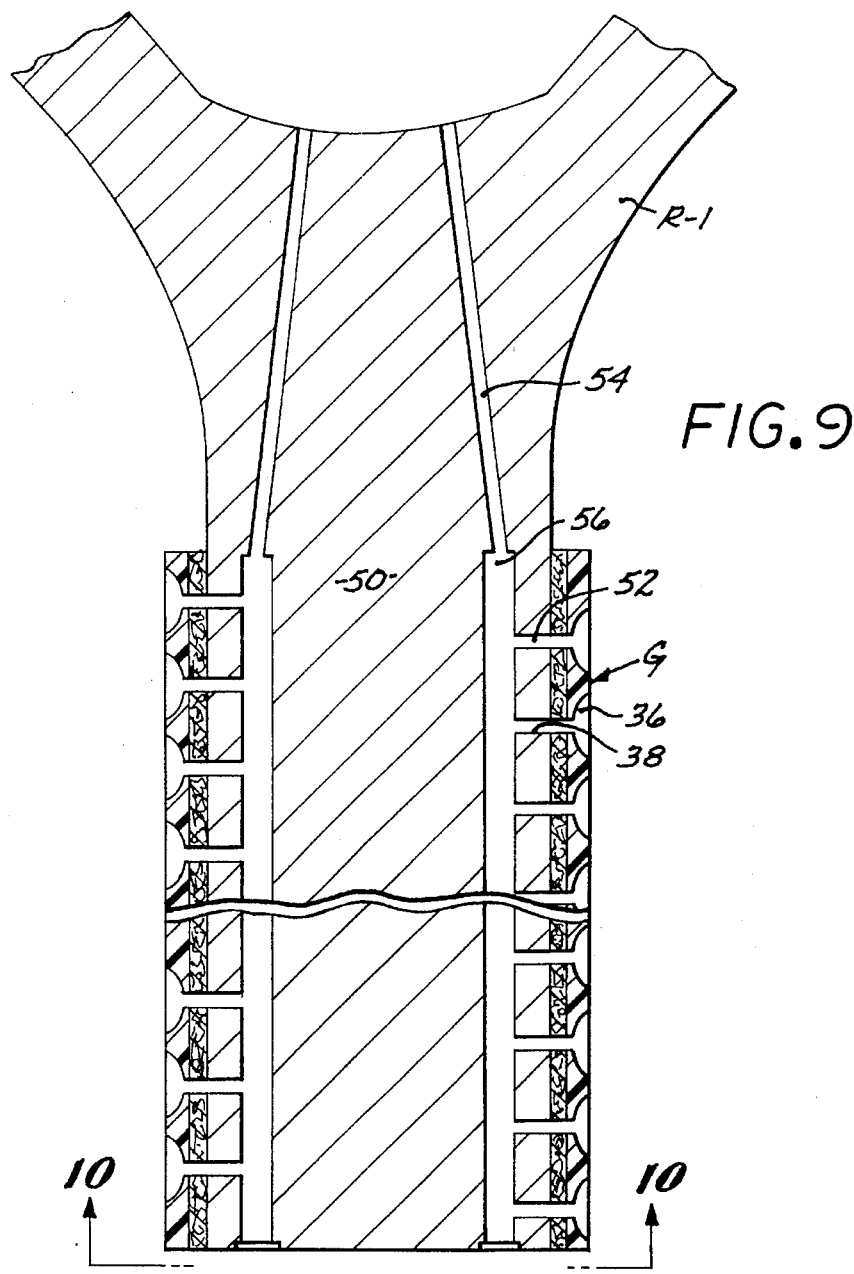
FIG. 9 is a broken cross-sectional side view of the grip of FIGS. 1–8 mounted on a tennis racquet constructed in accordance with an embodiment of the present invention.
Figure 10:
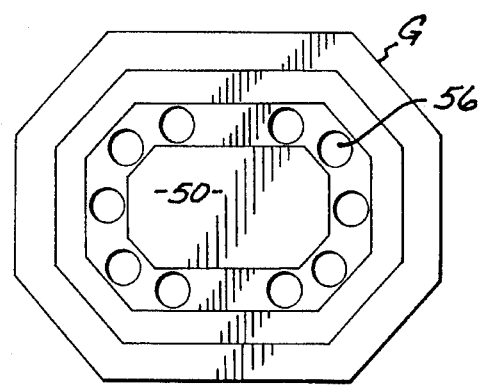
FIG. 10 is a horizontal sectional view in enlarged scale taken on line 10—10 of FIG. 9, with the upper portion of the racquet being deleted in the interest of clarity.

As indicated in FIG. 4, the portions of the felt layer 12 outwardly of its central region are slanted upwardly and outwardly at 24 to facilitate wrapping of the completed polyurethane and felt strip around the racquet handle 10. The underside 14 of the felt is provided with a conventional adhesive layer 30 which is originally covered with a protective quick-release tape 32. To apply the grip G to the racquet handle 10, the protective tape 32 is stripped off the adhesive 30 as indicated in FIG. 3. Thereafter, the strip of bonded-together polyurethane and felt is tightly wrapped around the racquet handle 10, as is conventional in mounting tennis handle grips of this type.

The layer of polyurethane 16 of grip G provides a cushioning effect for the grip when the tennis racquet R impacts a tennis ball (not shown). The polyurethane layer 16 also provides tackiness so as to inhibit the racquet user's hand from slippage as the tennis ball is struck. The porous felt layer 12 provides strength to the polyurethane layer 16 and also serves as a means for attaching the bonded-together polyurethane and felt strip to the racquet handle. The polyurethane layer is provided with a plurality of inwardly extending dimples 36, the lower portion of each of which merges into a perforation 38 which extends through the felt layer 12 and adhesive 30. It has been found that when the grip G is grasped by a player with the palm and fingers of the player's hand covering the dimples 36, air is first pumped inwardly through the dimple 36 and perforations 38 and then into the felt. When the player relaxes his grip and, uncovers the dimples 36, air will be sucked back through the dimples and perforations to achieve "breathing" of air by the grip. The felt layer permits movement of the air inwardly and outwardly relative to the grip because of its porosity. The interchange of air as it is pumped through the grip serves to evaporate perspiration which would normally accumulate on the exterior surface of the polyurethane layer. Accordingly, the player maintains a better hold on the grip than is true with previously known grips, and is less likely to acquire "tennis elbow." It has been determined that good results are obtained where a diameter of about ⅛" is utilized for the dimples at the intersection with the outer surface of the polyurethane layer, and a diameter of about 1/32" is used for the perforations.

Figure 2:
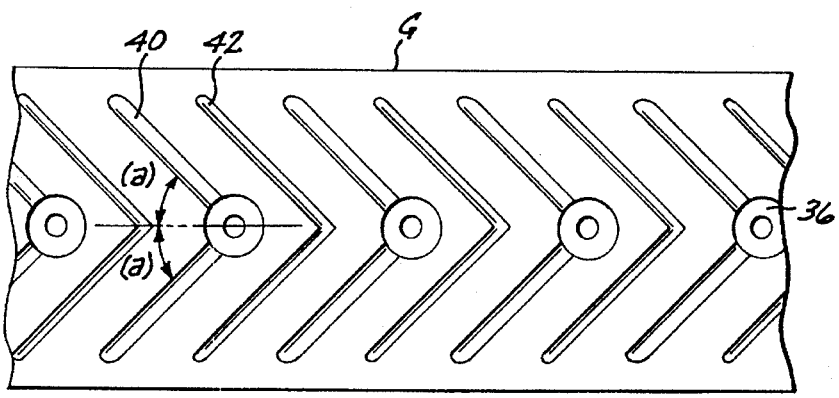
FIG. 2 is a broken view of the top of said grip.

The outer surface of the polyurethane layer 16 of grip G is also formed over its surface with a first plurality of treads 40, shown particularly in FIGS. 1, 2, and 4. Such treads preferably are arranged in a herringbone pattern. The main purpose of such treads is to channel perspiration from the player's hand into the dimples 36 and perforations 38 to thereby reduce slippage of the player's hand on the grip G. Treads 40 also increase the frictional contact of the player's hand relative to the grip. The perspiration channeling function of the treads 40 is effected by connecting the converging portions of such treads with the dimples 36 and hence with the perforations 38. Preferably, the angles (a) between the longitudinal center-line of grip G and the facing edges of treads 40 will approximate 45 to 50 degrees.

The polyurethane layer 16 is additionally preferably formed with a second plurality of treads 42 alternately positioned in a herringbone pattern between treads 40. Treads 42 assist treads 40 in increasing functional contact between a player's hand and grip G without weakening the structural integrity of the grip. Treads 42 also make the overall tread pattern more attractive. Since treads 42 do not function to conduct perspiration to dimples 36, such treads may be thinner than treads 40.

As noted hereinbefore, applicant has discovered that greatly improved shock absorbing qualities may be obtained in a tennis racquet grip where the thickness of the polyurethane layer relative to the thickness of the felt layer is increased over the ratio employed in prior art grips. More specifically, applicant considers that the ratio of the thickness of the polyurethane layer to the textile layer should be a minimum of approximately 0.28, i.e., equal to or larger than approximately 0.18. In the embodiment shown in the drawings and, as indicated in FIG. 4, in a grip having a total thickness of 2.0 mm, the polyurethane layer has a thickness of 1.1 mm, while the felt layer has thickness of 0.9 mm, i.e., the thickness of the polyurethane body is about equal to or slightly thicker than the thickness of the textile body. Excellent results have been obtained with this ratio.

Figure 11:
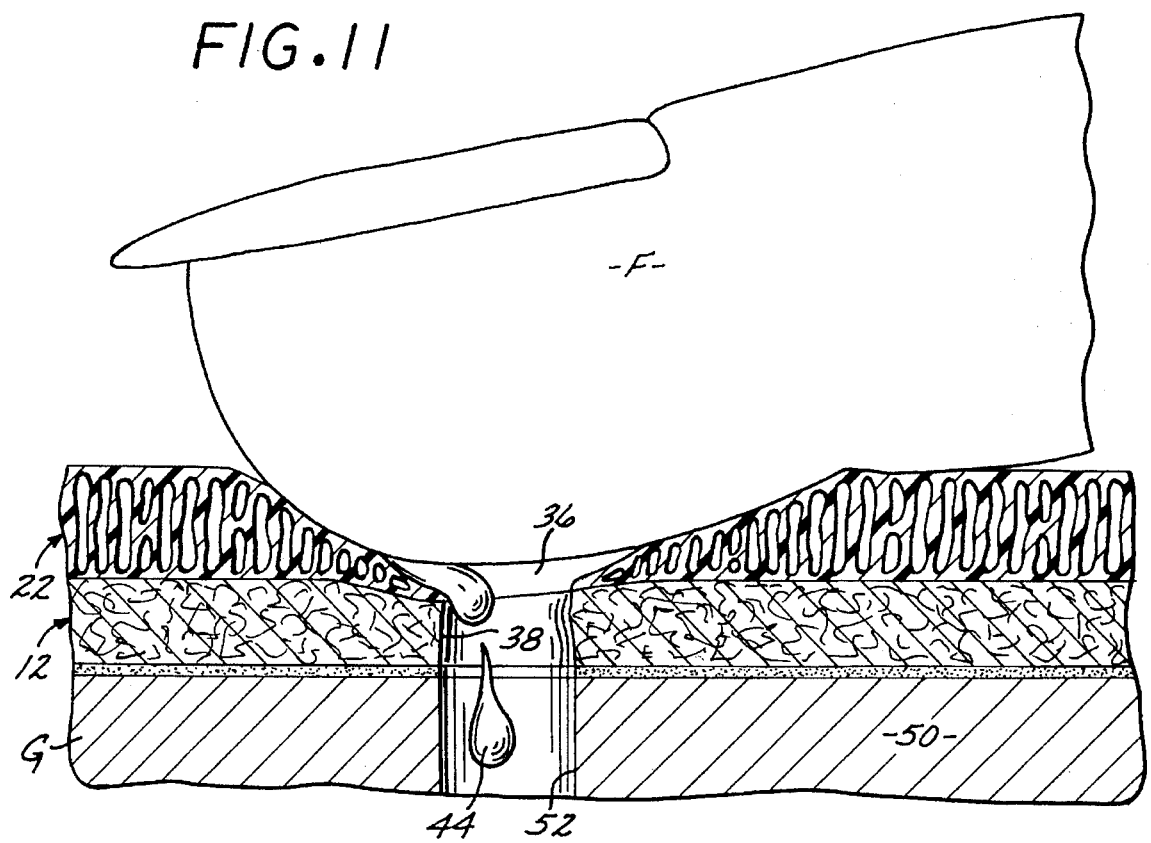
FIG. 11 is a vertical sectional view in enlarged scale showing how the grip of FIGS. 1–8 deforms when grasped by a user to force perspiration through the grip's perforations and dimples.
Figure 12:
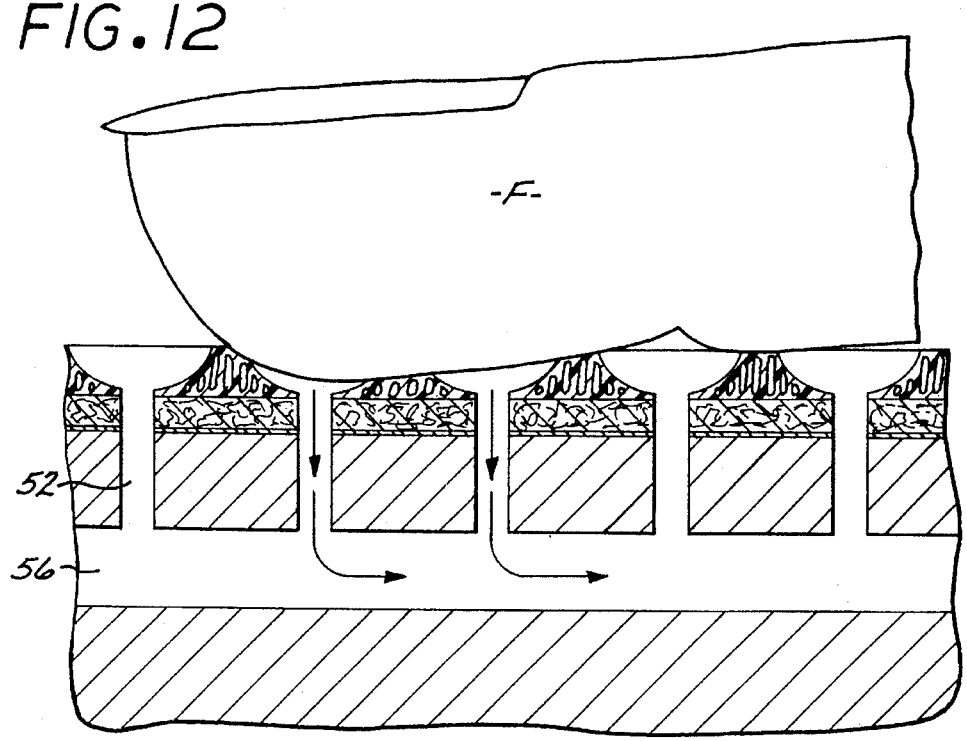
FIG. 12 is a reduced view similar to FIG. 11 showing how the grip deforms when grasped by a user to pump air through the racquet passage.

Referring now to FIGS. 11 and 12, such figure shows how the improved grip G of the present invention deforms when grasped by the fingers F of a user. Thus, the user's fingers compress the polyurethane layer 22 to a considerable extent while only slightly compressing the felt layer 12. Compression of the polyurethane is enhanced by the vertical alignment of the pores 22. Such compression not only greatly inhibits the shock applied by the racquet to the user's arm and hand created when the tennis ball hits the tennis racquet but also permits perspiration 44 which has been channeled through treads 40 into dimples 36 to be forced into perforations 38, as shown particularly in FIG. 11. Compression of the polyurethane layer 22 also serves to pump air through dimples 36 and perforations 38 to permit breathing of air by the grip to thereby assist in effecting continuous evaporation of such perspiration. Additionally, the extent of compression afforded by the polyurethane enhances the gripping power of the user's hand, particularly when coupled with the tackiness of the polyurethane.

It should be noted that, although grip G can be mounted on a conventional tennis racquet as represented by FIG. 6, it may also be mounted on a racquet specially developed for use with such unique grip. Thus, referring now to FIGS.

9–12, the aforedescribed grip G is shown mounted on a racquet R-1. Racquet R-1 differs from a conventional racquet in that the handle thereof 50 is formed with a plurality of air passages that are in communication with the atmosphere, such air passages being connected with the dimples and perforations of grip G. More particularly, racquet handle 50 is formed with a plurality of vertically extending main air passages 52, i.e, generally normal to the longitudinal axis of racquet handle 50. The upper ends of which merge with a plurality of auxiliary air passages 54 formed in the racquet throat. The racquet handle 50 is also formed with a plurality of horizontal air passages 56 which intersect the vertical air passages. The radially outer ends of horizontal air passages 56 are aligned with the grip perforations 38, and hence the dimples 36 of the grip. As indicated particularly in FIGS. 11 and 12, with this arrangement, when the grip G is grasped by the fingers F of a user, the user's fingers compress the polyethylene layer 16 to a considerable extent, while only slightly compressing the felt layer 12. It is important to note that compression of the grip G is facilitated by the alignment of the dimples and perforations with the air passages of the racquet R-1, such compression of the grip G serving to pump air through the racquet, since such passages are in communication with the atmosphere, as indicated in FIG. 11. This pumping action increases the amount of air circulating through the grip to keep a player's hand dry and comfortable, and also enhances the shock absorbing function of the grip. As indicated in FIG. 12, this pumping action also serves to force perspiration 44 radially inwardly through dimples 36 and perforations 38 into the racquet air passages for rapid evaporation Grip G is mounted on tennis racquets R and R-1 in the same manner. Specifically referring to FIG. 6, the grip G will be spirally wrapped around racquet handle after protective tape 60 has been stripped off the adhesive 30, as shown in FIG. 3. It should be noted that the horizontally extending air passages 56 are arranged in a spiral pattern conforming to the spiral pattern utilized to apply the grip G to the racquet handle. In this manner the perforations and dimples of the grip will be properly spaced to be in alignment with the horizontal air passages 56.

Referring now to FIG. 13, there is shown a modified grip G' embodying the present invention. In FIG. 13, the grip's polyurethane layer is formed solely with one set of treads 40', the converging portions of which intersect dimples 36.

It should be noted that the tread, dimple, and perforation construction described hereinbefore may also be utilized with a sleeve type grip (not shown). The materials and construction of such sleeve type grip would be similar to that of the grip G or G', in that such sleeve type grip is provided with a textile layer similar to the felt layer of grip G or G' which has its upper surface bonded to the lower surface of a polyurethane layer. The polyurethane layer would be formed with pores which extend vertically, i.e., generally normal to the longitudinal axis of the racquet handle when the grip is affixed to such handle. The thickness ratio of the felt and polyurethane layers will be similar to the thickness ratios described herein with respect to grip G. When such sleeve type grip is slipped over a racquet handle of the type shown in FIGS. 8–12, the dimples and perforations would be aligned with the horizontal air passages of the racquet handle. Accordingly, the sleeve type grip would cooperate with the vertical and horizontal air passages of the racquet handle to provide a pumping action when the sleeve type grip is grasped by the fingers of a user so at to provide the advantages of the grip G' as described previously herein.

Various modifications and changes may be made with respect to the foregoing detailed description without departing from the spirit of the present invention.

What is claimed is:

1. The combination of a racquet and a grip for the handle of such racquet, wherein the grip comprises, an open-pored textile layer having an inner surface adhered to and abutting said handle, and a smooth closed pore polyurethane layer having its inner surface bonded to the outer surface of the textile layer remote from said handle, with the pores of such polyurethane layer extending generally normal to the longitudinal axis of said handle, said polyurethane layer being formed with a plurality of inwardly extending dimples, the lower end of each of which merge into a perforation that extends inwardly through said felt layer, said polyurethane layer also being formed on its outer surface with a plurality of treads, at least some of which are in communication with said dimples to channel perspiration into said dimples and perforations; and the racquet handle is formed with air passages that are in communication with the atmosphere, the grip perforations being in alignment with the air passages whereby air and perspiration are forced through said treads, dimples, perforations, and racquet passages when the grip is grasped by a user with his palm and fingers covering some of the dimples.

2. The combination as set forth in claim 1 wherein the diameter of each dimple at its intersection with the outer surface is about ⅛", and the diameter of each perforation is about ⅟₃₂".

3. The combination as set forth in claim 1 wherein the treads are arranged in a herringbone pattern, and the converging portions of each pair of such treads intersect a dimple.

4. The combination as set forth in claim 1 wherein said polyurethane layer is additionally formed with a second plurality of treads arranged in a herringbone pattern alternately positioned between the first-mentioned treads.

5. The combination of a racquet or the like and a grip for the handle of such racquet or the like, said grip comprising an open-pored textile layer having an inner surface adhered to and abutting said handle, and a smooth closed pore polyurethane layer having its inner surface bonded to the outer surface of the textile layer remote from said handle, with the pores of such polyurethane layer extending generally normal to the longitudinal axis of said handle, said polyurethane layer being formed with a plurality of inwardly extending dimples, the lower end of each of which merge into a perforation that extends inwardly through said felt layer; and said polyurethane layer also being formed on its outer surface with a plurality of treads, at least some of which are in communication with said dimples to channel perspiration into said dimples and perforations whereby perspiration and air is forced through said dimples and perforations when the grip is grasped by a user with his palm and fingers covering some of the dimples.

6. The combination as set forth in claim 5 wherein the treads are arranged in a herringbone pattern and the converging portions of each pair of such treads intersect a dimple.

7. The combination as set forth in claim 5 wherein said polyurethane layer is additionally formed with a second plurality of treads arranged in a herringbone pattern alternately positioned between the first-mentioned treads.

8. The combination of a racquet and a grip for the handle of such racquet, wherein the grip comprises, a resilient body having an inner surface adhered to and abutting said handle, said body being formed with a plurality of inwardly extending dimples, the lower end of each of which merge into a perforation that extends inwardly through said body, said body also being formed on its outer surface with a plurality of treads, at least some of which are in communication with said dimples to channel perspiration into said dimples and perforations; and the racquet handle is formed with air passages that are in communication with the atmosphere, the grip perforations being in alignment with the air passages whereby air and perspiration are forced through said treads, dimples, perforations, and racquet passages when the grip is grasped by a user with his palm and fingers covering some of the dimples.

9. The combination of a ball impacting device and a grip for the handle of such device, wherein the grip comprises, a resilient body having an inner surface adhered to and abutting said handle, said body being formed with a plurality of inwardly extending dimples, the lower end of each of which merge into a perforation that extends inwardly through said body, said body also being formed on its outer surface with a plurality of treads, at least some of which are in communication with said dimples to channel perspiration into said dimples and perforations.

* * * * *